United States Patent [19]

Schneider

[11] 4,108,618
[45] Aug. 22, 1978

[54] ANTI-FOAM CHAMBER FOR SCREW COMPRESSOR OIL SEPARATOR

[75] Inventor: Anthony C. Schneider, Etters, Pa.

[73] Assignee: Freezing Equipment Sales, Inc., York, Pa.

[21] Appl. No.: 771,353

[22] Filed: Feb. 23, 1977

[51] Int. Cl.² .................................................. B01D 19/02
[52] U.S. Cl. ........................................ 55/178; 55/274
[58] Field of Search .................. 55/87, 178, 185, 189, 55/192, 274; 210/94, 95

[56] References Cited

U.S. PATENT DOCUMENTS

| 569,016 | 10/1896 | Darrow | 210/95 |
|---|---|---|---|
| 1,609,413 | 12/1926 | Kristofferson | 55/178 |
| 1,613,507 | 1/1927 | Feely | 210/95 |
| 1,654,803 | 1/1928 | Griffith | 210/95 |
| 2,379,396 | 6/1945 | Ziliotto | 55/178 |
| 2,869,673 | 1/1959 | Erwin | 55/192 |
| 3,360,903 | 1/1968 | Meyer | 55/274 |

Primary Examiner—Frank W. Lutter
Assistant Examiner—David L. Lacey
Attorney, Agent, or Firm—Sherman Levy

[57] ABSTRACT

A device for eliminating the problem of determining the true oil level in the oil separator of a screw compressor assembly. Refrigerant liquid injection screw compressors create foam in the oil separator and cause a problem of oil level determination. The present invention isolates the foam and provides an accurate indication of operating oil level in the primary section of the screw compressor oil separator.

1 Claim, 7 Drawing Figures

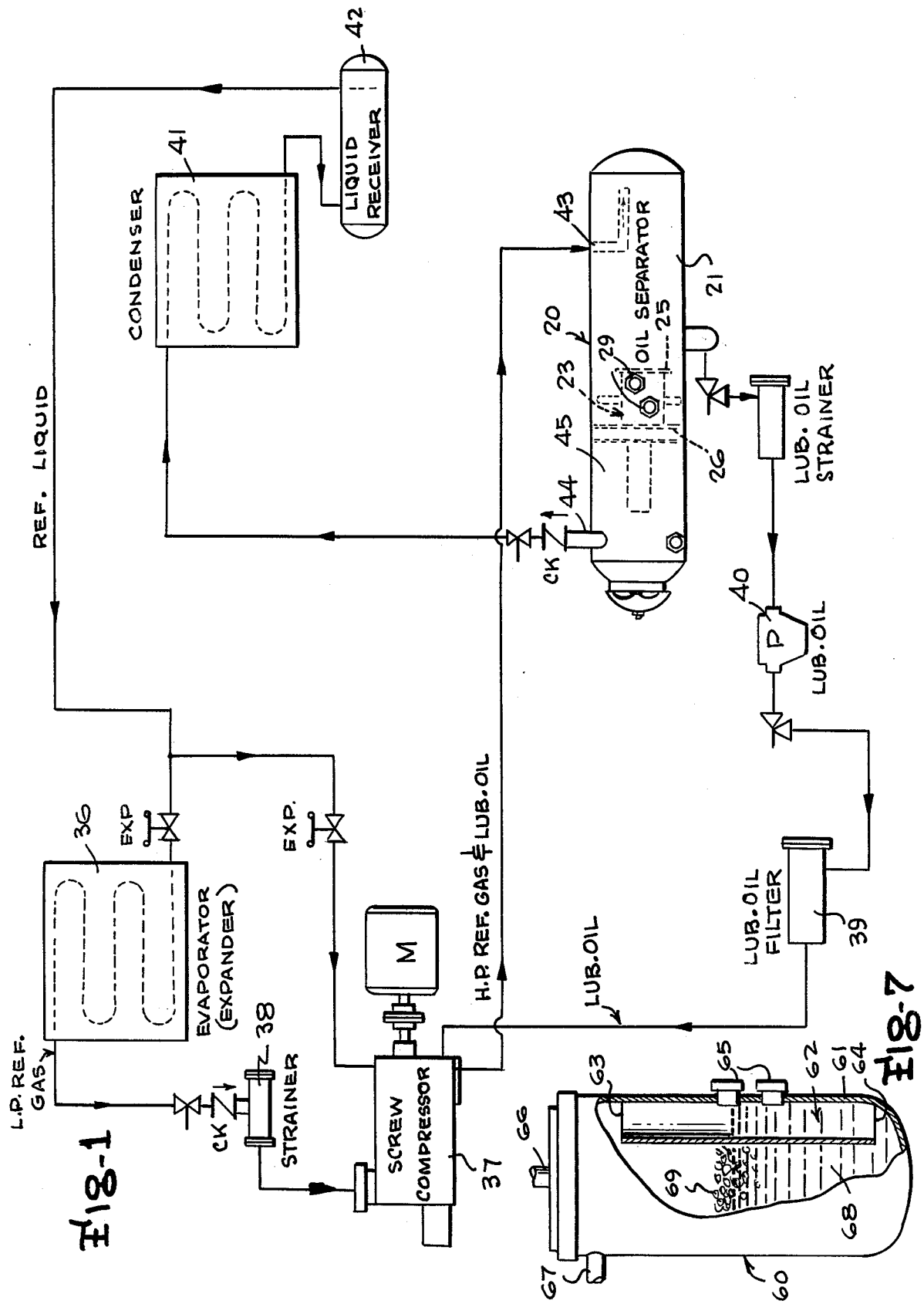

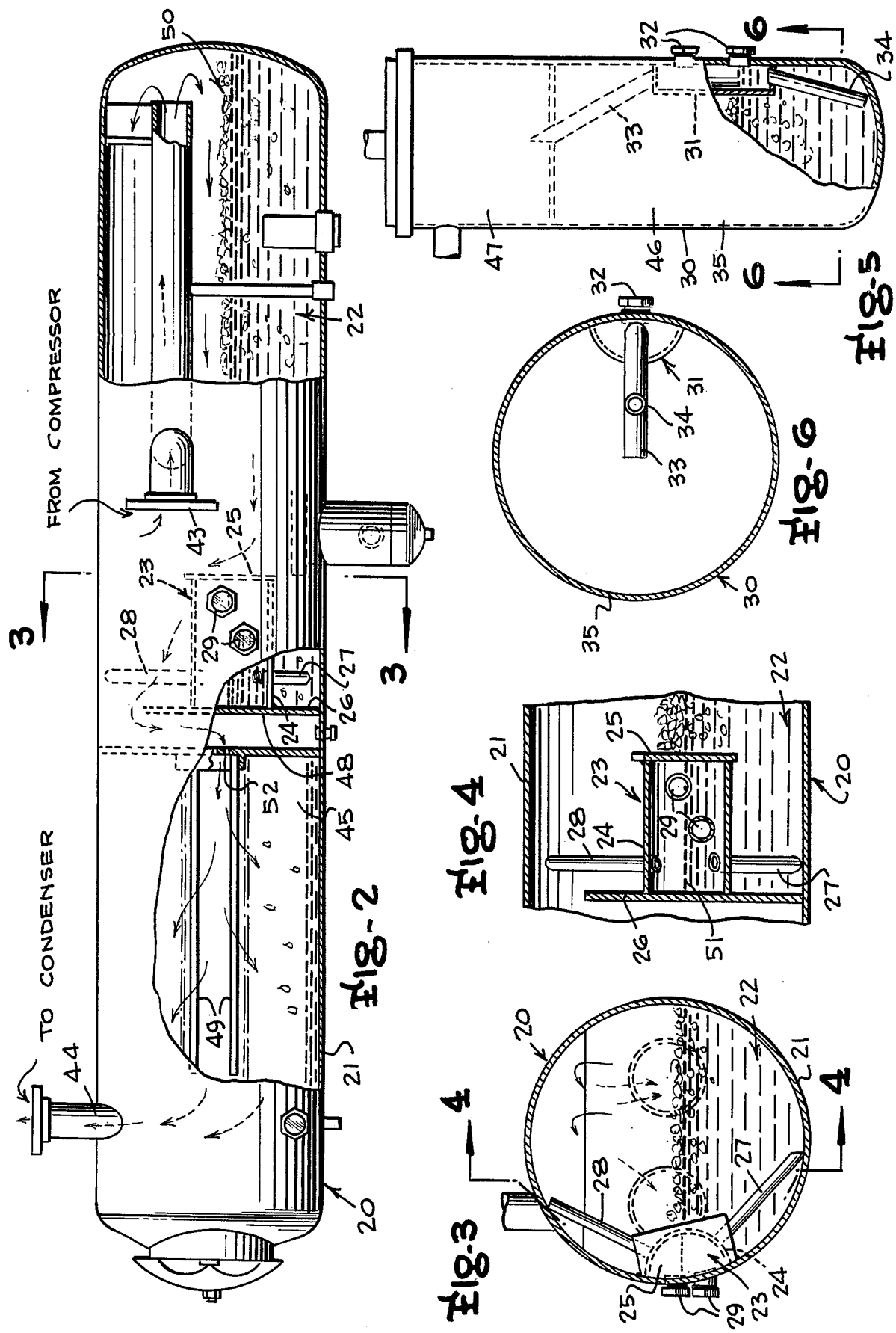

ANTI-FOAM CHAMBER FOR SCREW COMPRESSOR OIL SEPARATOR

BACKGROUND OF THE INVENTION

Field of the Invention

The present invention relates to an anti-foam chamber for screw compressor oil separators. Positive displacement rotary screw compressors used in refrigeration systems are normally provided with lubricating oil which is directly injected into the compression volume in order to seal the rotor clearance. This injected oil, along with the refrigerant gas, is pumped into a multi-stage oil separator to remove the injected oil before the gaseous refrigerant enters the refrigerant condenser.

Refrigerant screw compressors, as described above, have been developed which are designed to cool this circulating lubricating oil by direct injection of the primary refrigerant into the compression volume. This injected refrigerant liquid mixes with the injected lubricating oil.

In the primary section of the oil separator, this mixture creates a foaming condition and a false lubricating oil level, resulting in an inaccurate indication of the true operating lubricating oil level.

Due to the foaming action, it is possible to lose control of the oil level and the compressor may fail because of insufficient lubrication, even though a low oil pressure safety control is in the circuit.

The foaming action in the separator also creates an abnormally high level of lubricating oil and cavitation of the oil pump could result because the decreased density of the foaming mixture lowers the net positive suction head on the oil pump suction connection even though a higher level of mixture may be indicated.

This condition could cause a problem for operating engineers due to the actual loss of a visible true oil level caused by the foaming action which may force the surface of the mixture above the view ports supplied to provide a macroscopic indication of the operating oil level.

SUMMARY OF THE INVENTION

The present invention provides a foam-free level in the primary section of the screw compressor oil separator which enables the operator to accurately determine the true oil level, before, during, and after the compressor is put in operation. This device may be installed in horizontal, vertical or inclined vessels by merely changing the equalizing connections to match the shell configuration.

In accordance with the present invention, in one form of the invention, an anti-foam chamber can be used in a horizontal multi-stage oil separator used with refrigerant-cooled rotary oil-injected screw compressors, and wherein the anti-foam device can also be used with horizontal, vertical, or inclined oil separators.

The primary object of the present invention is to provide an anti-foam chamber for screw compressor oil separator that has improved characteristics and advantages as compared to previous devices.

Still another object of the present invention is to provide an anti-foam chamber for screw compressor oil separators, that is relatively simple and inexpensive to manufacture and operate.

Other objects and advantages of the present invention will become apparent in the following specification when considered in the light of the attached drawings.

BRIEF DESCRIPTION OF THE DRAWINGS

Various applications of the invention have been selected for the purpose of illustration and description, and are shown in the accompanying drawings forming a part of the specification, wherein:

FIG. 1 is a schematic view of a refrigeration system embodying the present invention therein;

FIG. 2 is an enlarged elevational view of an oil separator and with parts broken away and in section, and illustrating the present invention therein;

FIG. 3 is a sectional view taken on the lines 3—3 of FIG. 2;

FIG. 4 is a sectional view taken on the lines 4—4 of FIG. 3;

FIG. 5 is an elevational view illustrating a modification and showing an oil separator in vertical position with the anti-foam chamber therein;

FIG. 6 is a sectional view taken on the line 6—6 of FIG. 5; and

FIG. 7 is a view of a modified or alternative form of the invention, with parts broken away and in section.

DESCRIPTION OF THE PREFERRED EMBODIMENTS

Referring in detail to the drawings, and more particularly to FIGS. 1 through 4 of the drawings, the numeral 20 indicates a multi-stage screw compressor oil separator that includes the usual outer shell 21 and the numeral 22 indicates the primary side or section of the separator 20. In accordance with the present invention, there is provided an anti-foam chamber 23 that is arranged within the shell 21, and the chamber 23 is defined by a curved wall member 24 that is secured to the inner surface of the shell 21. A pair of spaced parallel plates 25 and 26 are secured to the ends of the chamber 23 as by welding, FIG. 4.

A liquid equalizing leg 27, and a gas equalizing leg 28 have their inner ends communicating with the interior of the chamber 23, and the outer ends of the legs 27 and 28 are open, the legs 27 and 28 being arranged angularly with respect to each other as shown in FIG. 3. The lower end of the leg 27 terminates at a point adjacent the bottom of the shell 21, while the upper end of the leg 28 terminates at a point adjacent the upper end of the shell 21.

View ports 29 are connected to the chamber 23 as shown in the drawings whereby the oil level within the chamber 23 can be accurately observed through the view ports 29.

Attention is directed to FIGS. 5 and 6 of the drawings wherein there is illustrated a modified or alternative form of the invention wherein the oil separator 30 is vertically disposed rather than being horizontally disposed as shown in FIGS. 1 through 4. Thus, in FIGS. 5 and 6 the vertically disposed oil separator 30 includes an anti-foam chamber 31 that has view ports 32 connected thereto, and angularly arranged liquid and gas equalizing legs 34 and 33 are connected to the chamber 31.

Attention is directed to FIG. 1 of the drawings wherein there is illustrated schematically a typical refrigeration system having the anti-foam chamber arranged in the oil separator. Thus, in FIG. 1 the numeral 36 indicates the evaporator (expander) that is connected to a conventional strainer by means of conduits, tubing or the like, and there is further provided for the system a screw compressor 37, lubricating oil filter 39, lubricating oil pump 40, condenser 41, liquid receiver 42, and the numeral 43 indicates the inlet to the multi-stage oil separator for high-pressure refrigerant gas and lubricating oil from the screw compressor 37. The numeral 44 indicates the outlet that is operatably connected to the condenser 41 by means of suitable tubing, conduits or the like. It is to be understood that the parts as shown in FIG. 1 are of conventional construction and that the present invention is directed solely to the anti-foam chamber such as the chamber 23 or the chamber 31.

From the foregoing, it will be seen that there has been provided an anti-foam chamber for screw compressor oil separators. The present invention will eliminate the problem of determining the true oil level in the oil separator of a screw compressor assembly. As is known, refrigerant liquid injection screw compressors create foam in the oil separator and cause a problem of oil level determination. The present invention isolates the foam and provides an accurate indication of operating oil level in the primary section such as the section 22 of the screw compressor oil separator 20.

Positive displacement rotary screw compressors used in refrigerant systems are normally provided with lubricating oil which is directly injected into the compression volume in order to seal the rotor clearances. This injected oil, along with the refrigerant gas, is pumped into a multi-stage oil separator such as the separator 20. The refrigerant gas is pumped into a multi-stage oil separator to remove the injected oil before the gaseous refrigerant enters the refrigerant condenser such as the condenser 41.

Refrigerant screw compressors such as the compressor 37 have been developed which are designed to cool the circulating lubricating oil by direct injection of the primary refrigerant into the compression volume. This injected refrigerant liquid mixes with the injected lubricating oil. In the primary section of the oil separator 20 or 30, this mixture creates a foaming condition and a false lubricating oil level, resulting in an inaccurate indication of the true operating lubricating oil level. Due to the foaming action, it is possible to lose control of the oil level and the compressor such as the compressor 37 may fail because of insufficient lubrication, even though a low oil pressure safety control is in the circuit.

The foaming action in the separator also creates an abnormally high level of lubricating oil and cavitation of the oil pump could result because the decreased density of the foaming mixture lowers the net positive suction head on the oil pump suction connection even though a higher level of mixture may be indicated. This condition could also cause a problem for operating engineers due to the actual loss of a visible true level caused by the foaming action which may force the surface of the mixture above the view ports supplied to provide a macroscopic indication of the operating oil level.

Briefly, the present invention provides an accurate indication of the true foam-free level in the primary section of the screw compressor oil separator which enables the operator to accurately determine the true oil level, before, during, and after compressor operation is put in operation. The device of the present invention may be installed in horizontal, vertical or inclined vessels by merely changing the equalizing connections to match the shell configuration.

FIGS. 1 through 4 illustrate the use of the anti-foam chamber in a horizontal multi-stage oil separator used with refrigerant-cooled rotary oil-injected screw compressors and certain details of construction of the anti-foam device which can be used with horizontal, vertical or inclined oil separators. FIGS. 5 and 6 illustrate the use of the anti-foam chamber in a vertical multi-stage oil separator used with refrigerant-cooled rotary oil-injected screw compressors.

FIGS. 1 through 4 illustrate the anti-foam chamber 23 installed in the primary side 22 of a multi-stage screw compressor oil separator 20. The chamber 23 communicates with the primary side 22 of the oil separator by means of a liquid equalizing leg 27 and a gas equalizing leg 28. These equalizing connections provide for the inflow of relatively refrigerant free oil into the anti-foam chamber from the bottom of the primary oil separator volume and for equalization of the chamber with the relatively oil free section of the primary oil separator. In FIGS. 1 through 4 the anti-foam chamber 23 is provided with view ports (single or multiple) as indicated by the numeral 29 to give visual observation of the oil level in the chamber 23.

The following is given as a description of the operation.

When the screw compressor such as the compressor 37 is not operating, the oil in the anti-foam chamber 23 and the oil in the primary oil separator are at the same level because the differential densities are equal. Therefore, the anti-foam chamber 23 renders an accurate oil level indication enabling the operating personnel to check the separator oil level before the compressor start-up.

When the compressor is started and assumes equilibrium operating conditions, the mixture of injected refrigerant and lubricating oil enters the primary side 22 of the separator 20 through the discharge pipe 43. This mixture enters the primary side 22 of the separator 20 where the majority of the lubricating oil separates from the refrigerant gas stream and mixes with the residual lubricating oil in the primary side 22 of the separator 20.

The oil which enters the separator 20 may contain some unevaporated refrigerant, which, because of the emulsifying action of the rotary screw compressor rotors, creates foam and bubbles in the residual oil volume. This mixture of oil, refrigerant and refrigerant gas decreases the density of the mixture and causes a rise in the oil level relative to the view ports 29. The anti-foam chamber 23, because it is equalized to the relatively refrigerant-free oil volume at the bottom of the primary side 22 of the oil separator 20 retains the refrigerant free condition of the initial oil charge and provides an accurate level indication during compressor operation, independent of the condition of the oil in the primary side 22 of the oil separator 20.

The true indication of oil level is always shown in the view ports 29 because the refrigerant-free oil in the anti-foam chamber 23 and the liquid equalizing leg 27 dynamically balance the refrigerant-oil mixture in the primary side 22 of the separator 20. As the density of this refrigerant oil mixture changes, the level in the anti-foam chamber reacts to dynamically balance the varying density and changing levels in the primary side 22 of the separator 20. The anti-foam chamber 23 always indicates the level which would exist in the primary side 22 of the oil separator 20 if there were no refrigerant, foam, or bubbles present.

After the screw compressor operation ceases, the anti-foam chamber oil level responds to the changing density and the level which occurs in the primary side 22 of the oil separator 20. The density and level change is caused by the collapse of the foam and the bubbles as the refrigerant escapes from the residual oil and leaves the primary side of the separator 20 as a gas which is free to flow to the secondary side 45 of the separator 20 and then passes through the separator discharge outlet 44 to the condenser 41.

Because the entire anti-foam chamber is contained within the separator shell 21 and is subject to a temperature above the system saturated condensing temperature, the condensation of refrigerant liquid within the anti-foam chamber 23 is physically impossible and retains a refrigerant-free condition.

It will therefore be seen that there has been provided an anti-foam chamber that provides a true indication of lubricant liquid levels in vessels (screw compressor oil separator) containing lubricants which are contaminated or which contain refrigerant liquid, refrigerant foam and/or refrigerant gas-filled bubbles.

The present invention will not cause condensed refrigerant liquid to appear in the sight glasses under normal circumstances because refrigerant-free oil is always fed into the anti-foam chamber from the bottom. Condensation of refrigerant vapor normally occurs in externally mounted gauge glasses and similar external mounted devices.

Further, the anti-foam chamber of the present invention is self regulating and always provides an accurate indication of lubricant liquid levels at all times during all modes of operation or non-operation of an oil injected, refrigerant-cooled rotary screw compressor.

In FIG. 5 the numeral 46 indicates the primary section of the separator 30, and the numeral 47 indicates the secondary section or chamber.

It is to be understood that with reference to a figure such as FIG. 1 and various accessories such as expansion devices, strainers, tubing or conduits, valves and the like can be used wherever needed.

The parts can be made of any suitable material and in different shapes or sizes as desired or required.

In FIG. 2 the numeral 48 indicates a baffle that is in the form of a weir that retains the oil volume in the primary side of the oil separator, and agglomerator elements 49 are mounted on the baffle 52 as shown in the drawings. Perforated hangers are provided for the agglomerator coalescing elements. In actual practice or use, the refrigerant gas flows through the coalescing medium and gives up micronic size oil particles which drip off the agglomerator elements and fall to the bottom of the secondary side of the oil separator for return to the primary side by circulation through the compressor.

The foaming action is indicated in the drawings and occurs generally in the area indicated by the numeral 50. In a figure such as FIG. 4 the numeral 51 indicates the true oil level in the chamber 23 which is free of foam, bubbles and the like.

Referring now to FIG. 7 of the drawings, there is illustrated a further modified or alternative form of the present invention that is indicated generally by the numeral 60 and wherein the numeral 61 indicates a shell 61 for the screw compressor oil separator 60. Arranged within the shell 61 is a chamber 62, and the upper end 63 of the chamber 62 is open as shown in the drawings, and the lower end 64 of the chamber 62 is also open so that the foam 69 will remain outside of the chamber 62 whereby the foam 69 is isolated from the chamber 62 so that by viewing through the sight glasses 65, an accurate indication of the operating oil level in the screw compressor oil separator 60 will be assured or provided. Conduits such as the conduits 66 and 67 are suitably connected to the unit 60 as shown in the drawings. The numeral 68 in FIG. 7 indicates a fluid or liquid, and it is to be understood that the space above the fluid or liquid 68 is filled with gas.

With further reference to the form of the invention shown in FIG. 7, the open ends 63 and 64 can be provided or created by notching, providing holes, diagonal cuts or the like. The extension of the body shell of the anti-foam chamber 62 creates gas and liquid equalizing legs so that additional legs such as the legs 27 and 28 or 33 and 34 are not required in the form of the invention shown in FIG. 7. The chamber 62 may be formed by an element that is welded to the separator shell 61. Thus, a foam-free oil level can be provided as for example as an anti-foam chamber in a vertical separator.

In those forms of the invention where legs such as equalizing legs are used, it is to be understood that a specific pipe configuration is not required. In FIG. 7 it is to be noted that the body of the anti-foam chamber actually creates the two equalizing legs in the vertical arrangement.

The anti-foam chamber will not cause condensed refrigerant liquid to appear in the view ports under normal circumstances because oil is always fed into the anti-foam chamber from the bottom and because the chamber is always subject to a temperature above the system saturated condensing temperature. This is important because all externally mounted sight devices will cause condensation.

It is also to be understood that the present invention is not limited to oil separators that may be vertically disposed or horizontally disposed since the separators can also be inclined.

The terms and expressions which have been employed here are used as terms of description and not of limitation, and there is no intention, in the use of such terms and expressions, of excluding equivalents of the features shown and described, or portions thereof, it being recognized that various modifications are possible within the scope of the invention claimed.

It is claimed:

1. In a multi-compartment oil-gas separator which comprises a shell, an oil-gas inlet, a gas outlet, an oil outlet and other connecting means, the improvement comprising an anti-foam chamber comprising a curved wall member, a portion of the oil-gas separator shell wall itself, connecting parallel plates which form and close the ends of the anti-foam chamber, open ended liquid and gas equalizing legs, said liquid equalizing leg being connected to the bottom side of the curved wall member terminating at a point adjacent to the bottom of the oil-gas separator shell, said gas equalizing leg connected to the top side of the curved wall member with the other end of the equalizing leg open and terminating at a point adjacent to the top of the oil-gas separator shell, the anti-foam chamber having view ports mounted through the oil separator shell wall, said anti-foam chamber disposed within the oil-gas volume of the oil separator shell, downstream of the oil-gas inlet and upstream of the gas outlet.

* * * * *